United States Patent [19]

Severinsson

[11] Patent Number: 4,953,669
[45] Date of Patent: Sep. 4, 1990

[54] ELECTRO-MECHANICAL BRAKE UNIT, PREFERABLY FOR A RAIL VEHICLE

[75] Inventor: Lars M. Severinsson, Hishult, Sweden

[73] Assignee: SAB Nife AB, Landskrona, Sweden

[21] Appl. No.: 326,119

[22] Filed: Mar. 20, 1989

[30] Foreign Application Priority Data

Mar. 21, 1988 [SE] Sweden ................ 8801026

[51] Int. Cl.⁵ ............... R61H 13/00; F16D 65/34
[52] U.S. Cl. ................... 188/171; 188/158; 188/161; 188/72.1
[58] Field of Search ............... 188/171, 170, 72.1, 188/158–165, 72.3, 216; 74/89, 89.15, 424.8 R, 110

[56] References Cited

U.S. PATENT DOCUMENTS

| | | |
|---|---|---|
| 874,219 | 12/1907 | Mahoney . |
| 2,218,605 | 10/1940 | Down . |
| 3,131,788 | 5/1964 | Newell . |
| 3,217,843 | 11/1965 | Newell et al. . |
| 3,280,944 | 10/1966 | Kyllonen . |
| 4,033,435 | 7/1977 | Bayliss . |
| 4,202,430 | 5/1980 | Stevens . |
| 4,476,965 | 10/1984 | Brown, Jr. et al. ............... 188/171 |

FOREIGN PATENT DOCUMENTS

| | | |
|---|---|---|
| 165156 | 5/1985 | European Pat. Off. . |
| 0155417 | 9/1985 | European Pat. Off. . |
| 0235035 | 9/1987 | European Pat. Off. . |
| 0275783 | 7/1988 | European Pat. Off. . |
| 3010335 | 3/1980 | Fed. Rep. of Germany . |
| 88/04741 | 6/1988 | PCT Int'l Appl. . |
| 2141500 | 12/1984 | United Kingdom . |

Primary Examiner—Douglas C. Butler
Attorney, Agent, or Firm—Laurence R. Brown

[57] ABSTRACT

An electro-mechanical brake unit includes a drive sleeve (8), which may be subjected to a torque, for example from a coil spring (6), and a ball screw (15, 25) for transforming the torque into an axial force for brake application. Between the drive sleeve and the ball screw there is a control arrangement, comprising an outer locking spring (16), a control sleeve (17), and an inner locking spring (18), a control motor (20) being connected to the control sleeve for rotation thereof in either direction. The control sleeve is connected to the locking springs for control of their locking and unlocking functions.

10 Claims, 2 Drawing Sheets

ELECTRO-MECHANICAL BRAKE UNIT, PREFERABLY FOR A RAIL VEHICLE

TECHNICAL FIELD

This invention relates to a brake unit, preferably for a rail vehicle, comprising an energy storing device, preferably a coil spring, means for supplying energy to said device, preferably an electric motor, and a drive sleeve for transmitting a rotational movement from said device to a ball screw or similar means for transforming said rotational movement into an axial movement of a force transmitting member.

BACKGROUND OF THE INVENTION

Conventionally, the braking of a rail vehicle is performed in that compressed air is admitted to a brake cylinder, wherein a piston moves axially and transmits an axial brake force. As an alternative, most often used for parking and emergency braking but occasionally also for service braking, a powerful spring is normally held compressed by compressed air in a cylinder, but when the air pressure is lowered a brake force is exerted.

There is currently a trend towards avoiding a compressed air system on modern rail vehicles, which means that no air for control or power generation is available. In contrast it is often desirable to utilize electricity both as the power generating medium and the control medium, partly in view of the frequent use of electronics in control systems and the simplicity in the equipment for transferring power in the form of electricity, which can be used for diverse applications on board a modern rail vehicle.

Accordingly, it is a growing interest for the concept called "braking by wire", i.e. a system in which electric power is transformed into a mechanical brake force in relation to an electric signal supplied from the driver. The requirements on such a system are high, for example with regard to accuracy and response times in view of possible anti-skid functions and so forth, but also with regard to simplicity, reliability and ability to withstand the rather extreme environmental stresses underneath a rail vehicle.

Several attempts to accomplish designs fulfilling the different requirements on so called electro-mechanical brake units are known. Examples of solutions where an electric motor is used to tension a normal spring (a helical spring), which applies the brake force when desired, are disclosed in US-A-874 219, US-A-2 218 605, US-A-4 033 435, US-A-4 202 430, DE-A-3 010 335, GB-A-2 141 500, and EP-A-166 156.

There are also examples of solutions where the energy from the electric motor is stored in a coil spring or clock spring, namely US-A-3 131 788, US-A-3 217 843, and US-A-3 280 944. In these solutions, stemming from one source, the application of the brake is controlled by the motor, which also is used for tensioning the spring. By this technique it is virtually impossible to obtain the response times and control necessary in modern systems.

THE INVENTION

In order to fulfil all requirements imposed thereon a brake unit according to the invention is characterized in that clutch and control means are arranged between the drive sleeve and the ball screw or similar movement transforming means for accomplishing a controlled force transmission from the energy storing device to the force transmitting member. As stated above, the energy storing device preferably is a coil spring and the means for supplying energy thereto a motor (preferably an electric motor) tensioning the spring. This motor is accordingly only used for keeping the coil spring tensioned independently of the force transmission therefrom.

The clutch and control means may as one alternative include an outer locking spring between the drive sleeve and the housing of the unit for permitting conditional rotation of the former in a direction for brake application, further an inner locking spring for connection between the drive sleeve and a drive ring, which is coaxial therewith and is connected to said transforming means, and a control sleeve for controlling the inner locking spring to perform its function to connect the drive sleeve with the drive ring only at the rotation of the drive sleeve in the direction for brake application but to allow rotation of the drive ring in a direction for brake release.

In a preferred embodiment the control sleeve, which is concentric with the drive sleevei and the drive ring, is connected with one end of the inner locking spring, whereby rotation of the control sleeve in a direction for brake release will open the locking spring and allow the drive ring to rotate the same angular distance as the control sleeve in the brake release direction.

Also, in a preferred embodiment one end of the outer locking spring, which normally prevents rotation of the drive sleeve in the brake application direction and is arranged coaxially outside the control sleeve, is connected to the control sleeve, whereby rotation thereof in a direction for brake application will open the outer locking spring and allow the drive sleeve to rotate the same angular distance as the control sleeve in the brake application direction.

In order to fulfil the requirement to control the brake unit "by wire" the control sleeve may be connected to an electric control motor for its rotation in either direction for brake application or release.

As another alternative the clutch and control means may include an outer locking spring between the drive sleeve and the housing of the unit for permitting conditional rotation of the former in a direction for brake application, further an inner locking spring for connection between the drive sleeve and a drive ring, which is coaxial therewith and is connected to said transforming means, and a control member, which is axially movable under the influence of two electromagnets for unlocking the end of either locking spring from the housingor the drive ring, respectively, and accordingly for allowing rotation of the drive sleeve in the brake application direction or the drive ring in the brake release direction, respectively.

BRIEF DESCRIPTION OF THE DRAWINGS

The invention will be described in further detail below reference being made to the accompanying drawings, in which.

DETAILED DESCRIPTION OF PREFERRED EMBODIMENTS

Figure 1:
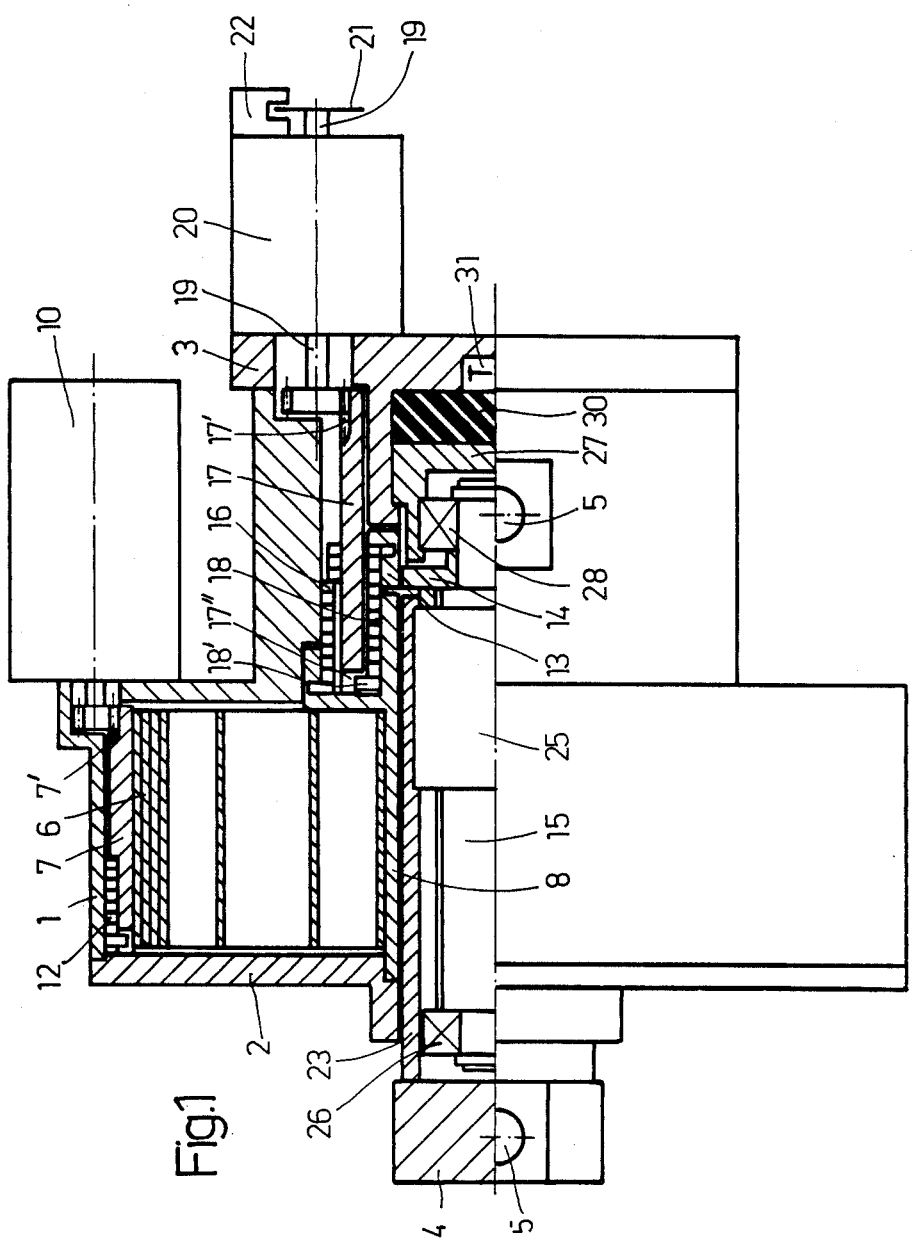
FIGS. 1 and 2 are respective side views, partly in section, of two embodiments of an electro-mechanical brake unit according to the invention.

An electro-mechanical brake unit according to FIG. 1 has a housing 1 with a spring lid 2 to the left in the drawing and a mechanism lid 3 to the right. The lids 2 and 3 are screwed on the housing 1. The unit is also provided with a force transmitting member 4, which as appears below is axially movable in relation to the housing 1. The housing 1 and the member 4 are provided with attachments 5 for the mounting of the unit, for example in a conventional disc brake caliper of a rail vehicle. (Such a brake arrangement is not shown in the drawing but is well known to any person skilled in the art.) In this way a movement of the member 4 to the left in the drawing will result in a brake application.

A powerful coil spring or clock spring 6 is arranged in the housing 1. The outer end of the spring 6 is anchored to a rotatable motor sleeve 7 and its inner end to a rotatable drive sleeve 8, which is journalled in the housing 1.

An electric motor 10 is attached to the housing 1. It is drivingly connected to a gear ring 7' on the motor sleeve 7. A one-way coupling, for example a locking spring 12, enables the motor sleeve 7 only to be rotated in the direction for tightening the coil spring 6.

Coaxial with the drive sleeve 8 is a rotatable drive ring 13 in splines engagement with a spindle ring 14, which is attached to a rotatable spindle 15.

A rotary force transmission between the drive sleeve 8 and the drive ring 13 (and thus the spindle 15 via the spindle ring 14) is performed by means of an arrangement consisting of three concentric members, namely an outer locking spring 16, a control sleeve 17, and an inner locking spring 18.

The outer end, or the end to the right in FIG. 1, of the control sleeve 17 is provided with a gear ring 17' in engagement with corresponding gears on the rotary motor shaft 19 of an electric control motor 20 attached to the mechanism lid 3. The shaft 19 of the motor 20, which preferably may be of DC or step motor type, is provided with a disc 21 cooperating with a fixed yoke 22. The disc 21 has circumferential control means, for example holes, for counting by the yoke 22 and thereby control of the rotation of the control motor 20, as will appear more clearly below.

A force transmitting sleeve 23 is attached to the force transmitting member 4. A ball nut 25, which together with the ball screw spindle 15 forms a ball screw, is non-rotatably attached to the force transmitting sleeve 23. The spindle 15 is journalled in the force transmitting sleeve 23 by means of a radial ball bearing 26 and in a force sensing cup 27 by means of a ball bearing 28. This bearing can also transmit axial forces from the spindle 15 to the cup 27.

An elastic disc 30 (of rubber or similar material) is confined between the force sensing cup 27 and the mechanism lid 3. A pressure transducer 31 is arranged in the lid 3 in contact with the elastic disc 30. By the design with a smaller force receiving area of the transducer 31 than the area of the force sensing cup 27, only a fraction of the total force from the spindle 15 is transmitted to the transducer 31, which may be of any conventional design and transmits an electric signal depending on the pressure or force exerted thereon.

The interaction between the different parts, especially the two locking springs 16 and 18 and the control sleeve 17, is to now be described.

The outer locking spring 16, which can also be called an application spring for reasons apparent below, primarily serves to prevent the drive sleeve 8 from rotating relative to the housing 1 in one direction. It is as shown axially confined, and its left hand end is locked to the drive sleeve 8. The major part of the spring 16 is arranged with its outer surface in contact with coaxial cylindrical inner surfaces of the sleeve 8 and the housing 1. A few turns of the locking spring 16 has a smaller diameter and are with its inner surface in engagement with the outer surface of the cylindrical control sleeve 17.

The inner locking spring 18, which can also be called a release spring, primarily serves to transmit rotational movement in one direction between the drive sleeve 8 and the drive ring 13 but also establishes a means for transmitting rotational movement in the other direction between the control sleeve 17 and the drive ring 13, as appears from the description below. The inner surface of the locking spring 18 is in contact with coxial cylindrical outer surfaces of the drive sleeve 8 and the drive ring 13. The right hand end of the spring 18 is locked to the drive ring 13, whereas its left hand end is provided with an upwardly projecting end 18' engaging an axial projection 17" at the left hand end of the control sleeve 17.

The function of the arrangement so far described is as follows: Assuming that the coil spring 6 is tensioned or wound up by the electric motor 10 and backwards rotation of the latter is prevented by the one-way coupling 12, the drive sleeve 8 is subjected to a large torque in one rotational direction. However, the sleeve 8 is normally locked against rotation in this direction by the application spring 16.

By turning the control sleeve 17 (by means of the control motor 20) it is, however, possible to "open" the outer locking spring or application spring 16, i.e. to turn it in the direction opposite the locking direction, by means of the spring turns in engagement with the control sleeve 17. Hereby the drive sleeve 8 will be free to turn under the action of the coil spring 6 until the application spring 16 again locks the sleeve 8 to the housing 1. The turning movement of the drive sleeve 8 corresponds in other words to that of the control sleeve 17. During this turning movement the inner locking spring 18—due to its locking direction—transmits the turning movement and the torque to the drive ring 13.

The torque transmitted to the drive ring 13 is transferred through the ball screw spindle 15 to an axial force in the ball nut 25, the force transmitting sleeve 23 and the force transmitting member 4. The application stroke or movement is to the left in the drawing.

It is to be noted that the drive sleeve 8 is only allowed to rotate (for transmitting its torque to the drive ring 13 via the inner locking spring 18) when and to the extent the control sleeve 17 is rotated by the control motor 20 in the unlocking direction for the application spring 16. It is also to be noted that the control sleeve 17 itself is not subjected to the torque of the drive sleeve 8 and that only the small torque needed to overcome the pretension of the locking spring 16 is required for the control sleeve 17.

The release stroke or movement of the force transmitting member 4 and sleeve 23 to the right in the drawing (subsequent to an application stroke as described above) can be divided into two steps: a first step during which the member 4 and sleeve 23 are subjected to a return force to the right from the brake disc (or other brake member) and the whole brake caliper or rigging (in which the brake unit is arranged) ending with the situation where the brake pads are just about to leave the brake disc bringing down the return force to zero, and a second step during which the brake pads are removed from the brake disc the desired distance, in the art referred to as the slack.

For accomplishing a movement in the release direction during the first step mentioned above the control sleeve 17 is rotated in the direction opposite to that during the application stroke as described above. This rotation is not prevented by the turns of the outer locking spring 16 in engagement with the control sleeve 17, as the latter now is rotated in the direction for loosening the grip of the locking spring 16 thereon.

By the engagement between the axial projection 17" of the control sleeve 17 and the upwardly projecting end 18' of the inner locking spring or release spring 18, the latter will not prevent the drive ring 13 from turning under the action of the force being transformed from an axial one in the nut 25 to a rotational one in the spindle 15, but only as far as the control sleeve 17 is rotated. During this rotation the drive sleeve 8—all the time being subjected to the torque from the coil spring 6—is prevented from rotating by the outer locking spring 16 in engagement with the housing 1.

Again, it shall be noted that the rotational movement of the drive ring 13 corresponds to that of the control sleeve 17 and that practically no torque for rotating the latter is required from the control motor 10, namely only the torque required to overcome the pretension of the inner locking spring 18.

During the second step of the release stroke no torque is transmitted to the drive ring 13 from the brake rigging via the spindle 15. In order to establish the desired slack between the brake disc and the brake pads in the brake rigging, it is therefore necessary to apply another rotational force on the drive ring 13 for retracting the brake pads from the brake disc. This rotational force, which is relatively minor, stems from the control motor 20. At the further rotation thereof in the release direction its rotational movement is transmitted to the drive ring 13 through the release spring 18. Still, the drive sleeve 8 is held against rotation by the outer locking spring 16.

There is an electric and electronic system associated with the mechanical arrangement so far described. This system, which is not shown in the drawing, has the general function to supply the electric motor 10 and the control motor 20 with electric energy and to control their functions in the following way:

As is understood by the description above, the only function of the electric motor 10 is to supply the accumulator in the form of the coil spring 6 with energy or in other words to keep the spring 6 under tension. The motor works intermittently.

The system is so designed that the motor 10 is started
(1) when the system has been without current for any reason, and
(2) after the control motor 20 has started.

On the other hand, the motor 10 is shut off when the motor current reaches a predetermined value, indicating a tensioned coil spring 6.

Generally speaking, the control motor 20 (and the control sleeve 17 associated therewith) acts as a servo for the spindle 15. It functions in the following way under different conditions:

As described above, an application stroke is accomplished by rotating the control sleeve 17 by the control motor 20 in a certain direction—the application direction.

When the pressure transducer 31 indicates that a desired brake force, or in other words a counter-force in the spindle 15 transmitted to the transducer 31 via the spindle ring 14, the ball bearing 28, the force sensing cup 27 and the elastic disc 30, is being reached the control motor 20 is shut off. This means that no further rotational movement is transmitted to the drive ring 13 from the drive sleeve 8 via the inner locking spring 18.

After say two turns of the control motor 20 in the application direction as determined by the disc 21 and the yoke 22 the electric motor 10 is started after previously having been shut off.

The release stroke on the other hand is accomplished by rotating the control motor 20 in the opposite direction—the release direction.

This rotation of the control motor 20 occurs until the transducer 31 indicates a very low counter-force in the spindle 15, say 2 kN. From this indication the control motor 20 is allowed to rotate a few extra turns as determined by the disc 21 and yoke 22 in order to establish the desired slack between the brake pads and the brake disc in the brake rigging.

Numerous modifications are possible of the embodiment shown in FIG. 1 and described above with reference thereto.

Generally speaking, the electric motor 10 may have a different position, if for example a shorter unit is required, and may even be replaced with some other means for supplying energy to the coil spring 6, for example an air motor or a fluid operated cylinder, having the functiion always to keep the coil spring 6 under sufficient tension. Also, the coil spring 6 may be replaced with another type of spring or any other means for storing energy.

The different mechanical components of the arrangement, for example the journalling of the rotating parts and the type of ball screw employed, may vary greatly as is well known to any person skilled in the art.

More specifically, however, the left hand end of the inner locking spring 18 may as an alternative to the arrangement shown and described have the same design as the right hand end of the outer locking spring 16.

Further, as an alternative to the arrangement for providing a signal depending on the axial force in the force transmitting member 4 or the spindle 15, i.e. the force sensing cup 27, the elastic disc 30 and the pressure transducer 31, other means may be employed, for example suitably arranged strain gauges. This signal may also be derived from other parts of the brake rigging.

Figure 2:
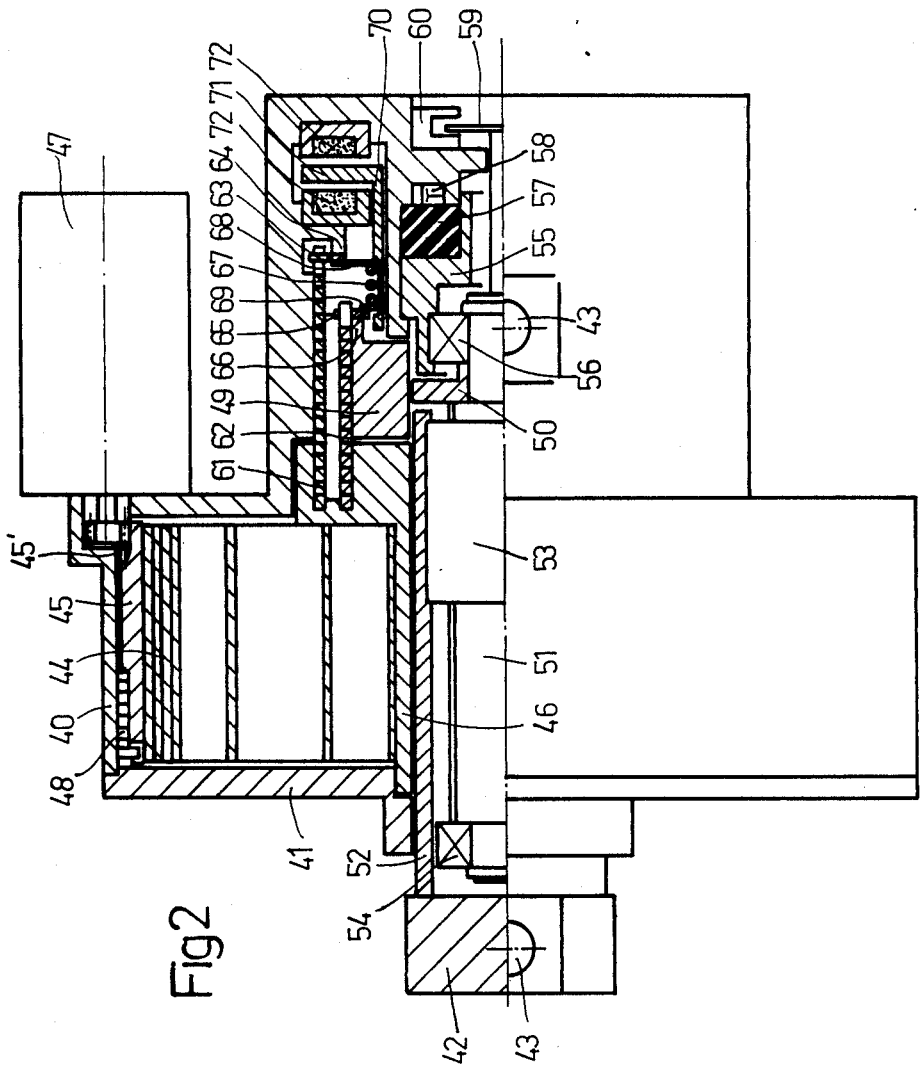

A second embodiment of the invention is shown in FIG. 2. This embodiment has many similarities with the first one shown in FIG. 1 and described above, whereas the main difference resides in the control system for the brake unit, which accordingly will be fully described.

The design and function of the following parts are virtually the same as in the first embodiment, and reference is accordingly made to the description above thereof: a housing 40, a spring lid 41, a force transmitting member 42, attachments 43, a coil spring or clock spring 44, a motor sleeve 45 with a gear ring 45', a drive sleeve 46, an electric motor 47, a locking spring 48, a drive ring 49, a spindle ring 50, a spindle 51, a force transmitting sleeve 52, a ball nut 53, a radial ball bearing 54, a force sensing cup 55, a ball bearing 56, an elastic ring 57, and a pressure transducer 58.

In this case the spindle 51 is prolonged and is provided with a disc 59 cooperating with a fixed yoke 60 (in the same way and for the same purpose as the disc 21 and yoke 22 in the FIG. 1 embodiment).

As in the FIG. 1 embodiment there is an outer locking spring 61 and an inner locking spring 62, generally speaking having the same functions as the corresponding locking springs 16 and 18 in the first embodiment. However, the control of these locking springs is quite different, as appears below.

The outer locking spring 61 is in its tensioned condition arranged with its outer surface in contact with coaxial cylindrical inner surfaces of the drive sleeve 46 and the housing 40. The inner locking spring 62 is in its tensioned condition with its inner surface in contact with coaxial cylindrical outer surfaces of the drive sleeve 46 and the drive ring 49.

A first clutch washer 63 is in non-rotatable but axially movable engagement with the right hand end of the outer locking spring 61. The washer 63 may engage a fixed shoulder 64 of the housing 40 to form a toothed clutch 63–64 therewith.

Likewise, a second clutch washer 65 is in non-rotatable but axially movable engagement with the right hand end of the inner locking spring 62. The washer 65 may engage a shoulder 66 of the drive ring 49 to form a toothed clutch 65–66 therewith.

The two clutch washers 63 and 65 are resiliently pressed apart for engagement with their respective shoulders 64 and 66 by a helical compression spring 67 arranged between two thrust collars: a first one 68 and a second one 69.

A cylindrical control member 70 is axially movable and provided with a radial part 71 arranged in the opposing fields of two electromagnets 72 fixed in the housing 40. At the two thrust collars 68 and 69 the control member 70 is provided with a cylindrical recess with a somewhat larger width than the distance between the two collars 68, 69. The respective end of this recess is arranged to cooperate with the respective collar in a way to be described below. In the show neutral position (where neither of the two electromagnets 72 is energized), however, both clutches 63–64 and 65–66 are held engaged by the spring 67 (via the collars 68, 69).

As already stated, the general function of the embodiment according to FIG. 2 is the same as that according to FIG. 1.

Assume that the coil spring 44 is tensioned and that a brake application is desired. In order to accomplish this the locking effect of the outer locking spring or application spring 61 on the drive sleeve 46 must be overcome. By energizing the left electromagnet 72 the control member 70 is moved to the left in FIG. 2 allowing the clutch 63–64 to be disengaged and the locking spring 61 to become untensioned, so that it leaves its engagement with the housing 40. The torque is transmitted from the drive sleeve 46 via the inner locking spring 62 to the drive ring 49 and to the further parts, as described in more detail above in conjunction with FIG. 1.

The application continues as long as the left electromagnet 72 is energized, which is controlled in the corresponding way as the rotation by the motor 20 of the control sleeve 17 in the FIG. 1 embodiment. When this electromagnet is de-energized, the clutch 63–64 is engaged and the locking spring 61 again expanded into engagement with the inner cylindrical surface of the housing 40 preventing any further rotation of the drive sleeve 46.

A release stroke is accomplished in that the other or right electromagnet 72 is energized, so that the control member 70 is moved to the right in FIG. 2 and the clutch 65–66 is disengaged. In this way the inner locking spring 62 becomes untensioned and leaves its locking engagement with the drive ring 49, which accordingly will be free to rotate in the release direction in the same way as described above with reference to FIG. 1.

The invention has above been described in its use as a brake unit. Generally speaking, however, it may equally well be utilized in many applications under the more generic term "actuator" for supplying a force or attaining a certain position for an external load.

I claim:

1. A brake unit, comprising energy storing means for providing energy by rotational movement, electric motor and drive means for supplying energy to said storing means, and a drive mechanism for transmitting a rotational movement from said energy storing means to conversion means for transforming said rotational movement into an axial movement of a force transmitting member, characterized in that clutch and control means are arranged between the drive mechanism and said conversion means for accomplishing a controlled force transmission from the energy storing means to the force transmitting member.

2. A brake unit according to claim 1, in which the energy storing means motor is a coil spring and the drive means comprises a mechanism coupled for tensioning the spring, characterized with means for keeping the coil spring tensioned independently of the force transmission therefrom.

3. A brake unit according to claim 2, characterized in that the motor is a rotary electric motor.

4. A brake unit according to claim 1, characterized in that the clutch and control means include an outer locking spring between the drive mechanism and a housing member of the brake unit for permitting conditional rotation of the drive mechanism in a direction for brake application, and further includes an inner locking spring for connection between a drive sleeve in the drive mechanism and a drive ring, which is coaxial with the drive sleeve and is connected to said conversion means, and a control sleeve for controlling the inner locking spring for connecting the drive sleeve with the drive ring only at the rotation of the drive sleeve in the direction for brake application but to allow rotation of the drive ring in a direction for brake release.

5. A brake unit according to claim 4, characterized in that the control sleeve is concentric with the drive sleeve and the drive ring and is connected with an end of the inner locking spring for rotation of the control sleeve in a direction for brake release to open the locking spring and allow the drive ring to rotate the same angular distance as the control sleeve in the brake release direction.

6. A brake unit according to claim 5, characterized in that an end of the outer locking spring normally prevents rotation of the drive sleeve in the brake application direction and is arranged coaxially outside the control sleeve and connected to the control sleeve for rotation thereof in a direction for brake application to open the outer locking spring and allow the drive sleeve to rotate the same angular distance as the control sleeve in the brake application direction.

7. A brake unit according to claim 6, characterized in that the control sleeve is connected to a further control motor for its rotation in either direction.

8. A brake unit according to claim 7, characterized in that means responsive to a predetermined brake force comprising a pressure transducer is arranged to transmit a signal for switching off the further control motor at its rotation in the brake application direction.

9. A brake unit according to claim 8, characterized in that the further control motor at its rotation in the brake release direction is arranged to rotate a certain angular distance for establishing a desired slack by means including a pressure transducer for transmitting a signal indicating that the brake force is virtually zero.

10. A brake unit according to claim 1, characterized in that the clutch and control means include an outer locking spring between the drive mechanism and a housing the unit for permitting conditional rotation of a drive sleeve in the control mechanism in a direction for brake application, and further including an inner locking spring for connection between the drive sleeve and a drive ring coaxial therewith and connected to said conversion means, and a control member axially movable under the influence of two electromagnets for unlocking the end of either locking spring from the housing or drive ring, respectively, for allowing rotation of the drive sleeve in the brake application direction and the drive ring in the brake release direction, respectively.

* * * * *